(12) United States Patent
Travers (10) Patent No.: US 7,098,559 B2
(45) Date of Patent: Aug. 29, 2006

(54) ENGINE USING THE TRANSITION STATE OF A SUPERCONDUCTOR TO PRODUCE ENERGY

(76) Inventor: Craig R. Travers, 1149 Dalton Rd., Honeoye Falls, NY (US) 14472

( * ) Notice: Subject to any disclaimer, the term of this patent is extended or adjusted under 35 U.S.C. 154(b) by 0 days.

(21) Appl. No.: 11/054,152

(22) Filed: Feb. 9, 2005

(65) Prior Publication Data

US 2006/0087179 A1    Apr. 27, 2006

Related U.S. Application Data

(62) Division of application No. 10/008,297, filed on Nov. 13, 2001, now Pat. No. 6,861,770.

(51) Int. Cl.
*H02K 7/02* (2006.01)
(52) U.S. Cl. .......................... 310/10; 310/11; 505/150
(58) Field of Classification Search ............ 310/10–11; 505/150, 162, 272, 875–878
See application file for complete search history.

(56) References Cited

U.S. PATENT DOCUMENTS

| | | | | | |
|---|---|---|---|---|---|
| 4,625,193 | A | * | 11/1986 | Purcell | 335/216 |
| 5,141,180 | A | * | 8/1992 | Reboux | 505/150 |
| 5,144,810 | A | * | 9/1992 | Nagao et al. | 62/47.1 |
| 5,684,616 | A | * | 11/1997 | Brotz | 359/198 |
| 5,991,647 | A | * | 11/1999 | Brockenborough et al. | 505/163 |

* cited by examiner

*Primary Examiner*—Thanh Lam
(74) *Attorney, Agent, or Firm*—Stephen B. Salai, Esq.; Brian B. Shaw, Esq.; Harter Secrest & Emery LLP (57) ABSTRACT

The inventive method uses a superconductor to generate energy. The superconductor is alternated between a temperature above and below a critical temperature defined by a transition between the superconducting and non-superconducting states. The superconductor interacts with a magnetic field as the superconductor changes states. Energy is harnessed by coupling with the magnetic field as its strength fluctuates. The method would be particularly suitable for harnessing solar energy in space.

11 Claims, 8 Drawing Sheets

ENGINE USING THE TRANSITION STATE OF A SUPERCONDUCTOR TO PRODUCE ENERGY

CROSS-REFERENCE TO RELATED APPLICATIONS

This application is a Divisional of allowed parent application Ser. No. 10/008,297, filed Nov. 13, 2001 now U.S. Pat. No. 6,861,770, entitled Using the Transition State of a Superconductor to Produce Energy, which parent application is hereby incorporated by reference.

BACKGROUND OF THE INVENTION

1. Field of the Invention

The invention pertains to generating energy using a superconductor and, in particular, to generating energy by interacting the superconductor with a magnetic field and cycling the superconductor through its transition temperature.

2. Description of Related Art

Since the discovery in 1911 that mercury is electrically superconductive when cooled to 4° K., many materials have been shown to become superconductive below some critical temperature or transition temperature $T_c$.

Superconductors are divided into type 1 and type 2. Type 1 superconductors tend to have a low $T_c$ and the transition between the non-superconducting and superconducting state typically occurs over a temperature span of less than 1° K. Type 1 superconductors are mainly pure metals that conduct electricity at room temperature. All type 1 superconductors only become superconducting at temperatures within less than 20 degrees K. of absolute zero. Examples are tungsten ($T_c$=0.15° K.), titanium ($T_c$=0.40° K.), aluminum ($T_c$=1.175° K.), tin ($T_c$=3.72° K.) and lead ($T_c$=7.2° K.). All these values are at normal pressures. The type 1 material with the highest known $T_c$ is sulfur, for which $T_c$ is about 17° K.; however, sulfur needs to be compressed to 930,000 atmospheres to become superconducting and 1.6 million atmospheres to achieve a $T_c$ of 17° K.

In type 2 superconductors, the transition between states usually extends over a broader range of temperature, typically 5° K. While type 1 and type 2 $T_c$ values overlap, the majority of type 2 materials superconduct at much higher temperatures than any type 1 material and include the so-called "high-$T_c$" superconductors, which are typically ceramic materials. Examples of type 2 superconductors are the elements vanadium ($T_c$=5.4° K.), technetium ($T_c$=7.8° K.) and niobium ($T_c$=9.25° K.). These and all further values of $T_c$ will be understood to be at atmospheric pressure.

The first superconductive wire was composed of $Nb_{0.6}Ti_{0.4}$. The first ceramic superconductor discovered, in 1986, was $La_{1.85}Ba_{0.15}CuO_4$, with a $T_c$ of 35° K. A common high-$T_c$ material is the compound $YBa_2Cu_3O_7$, often referred to as "YBCO" or "123". YBCO has a $T_c$ of 93° K. The highest $T_c$ currently known is 138° K. for the compound $Hg_{0.8}Tl_{0.2}Ba_2Ca_2Cu_3O_{8.33}$.

Practical applications have been sought for superconductive materials. One use is in power transmission, in which the absence of electrical resistance would significantly reduce power losses. Power transmission over long distances is precluded by the requirement to maintain low temperatures by some means such as using liquid nitrogen. There have been specialized commercial applications; for example, power transmission over relatively short distances through limited spaces such as tunnels is greatly increased by using superconductors, to a degree not achievable by using conventional power cables.

Other behaviors are associated with superconductivity, in particular the Meissner effect, whereby an article in a superconductive state can strongly deflect a magnetic field; the superconductor and a magnet will produce a mutually repulsive force. This effect is used in magnetic levitation (maglev) transportation systems that are in development.

BRIEF SUMMARY OF THE INVENTION

Hitherto, superconductors have been applied for practical use substantially under steady state conditions; that is, they are maintained in a superconducting state. The present invention discloses engines for producing usable energy by cycling a superconductor repeatedly through a transition region between a superconducting and a non-superconducting state, by alternately cooling and heating the article through $T_c$. In the presence of a magnetic field, this causes the strength of the field to vary at a given point. Coupling an energy conversion means with the magnetic field provides a way of generating usable energy. Embodiments are disclosed in which mechanical and electrical energy is generated.

It will be understood that the term "generating" is used in an accepted sense of producing energy in a usable form, which strictly refers to harnessing one form of energy and converting it to another form that is more appropriate for a contemplated use. For example, chemical or nuclear energy can be released from an appropriate fuel as thermal energy. Thermal energy can be harnessed as mechanical energy to drive a vehicle or an electrical generator. Electrical energy can be transmitted over long distances, then reconverted to other forms of energy such as mechanical or thermal energy as required. Each step in a chain of energy conversion involves some inefficiency with a consequent loss of energy.

In the present invention, a superconductor is heated and cooled through $T_c$ so that it cycles between the superconducting and a non-superconducting state, in the presence of a magnetic field produced by a magnet. The magnetic field strength at a given point consequently fluctuates. This fluctuation can be translated into mechanical energy by allowing the superconductor and magnet to repel each other. A movable arm is attached to either the superconductor or the magnet.

The fluctuation can also be translated into electrical energy. An electrical current can be induced in a conductor such as a wire or coil directly exposed to the fluctuating magnetic field strength. Alternatively, a piezoelectric body can be coupled with either the superconductor or the magnet so that it responds to a fluctuating force therefrom; the electrical conductor can be connected to the piezoelectric body to accept the electrical current therefrom.

DETAILED DESCRIPTION OF THE INVENTION

In the following description, terms such as "superconductor" or "superconducting article" are understood to refer to an article having a superconducting and a non-superconducting state. The terms are not intended to define whether or not the article is currently in the superconducting state.

This invention relates to generating energy using a superconducting article 100 by coupling with a magnetic field 102 that changes as a result of a transition of the article between the states, such that the magnetic field strength at some given point fluctuates.

Figures 1, 2A, 2B:
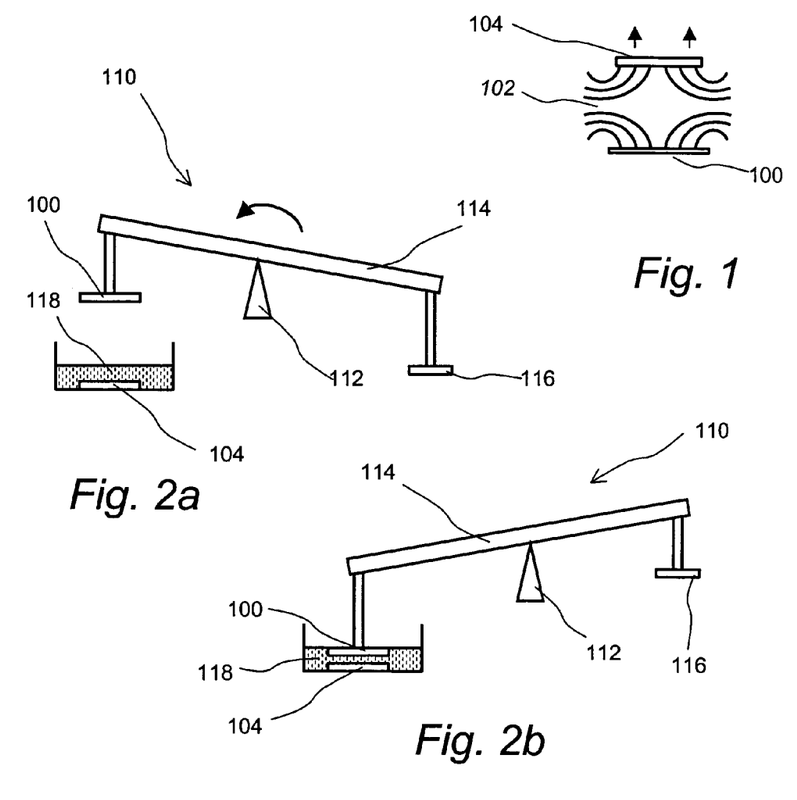
FIG. 1 is a diagram showing the levitation of a magnet by an article in a superconducting state.
FIGS. 2(a), 2(b) and 2(c) are schematics of an engine for generating mechanical energy from the transition of a superconducting article between a non-superconducting and a superconducting state, the engine being shown in different operating positions.

Superconductors when in a superconducting state will strongly interact with a proximate magnetic field 102. This phenomenon is manifested by the well-known Meissner effect, in which a magnet 104 is levitated by the repulsion from the superconducting article 100 below $T_c$, as illustrated in FIG. 1. Above $T_c$, interaction between the superconductor and the magnetic field is no stronger than with other comparable materials. For example, a ceramic superconductor in the non-superconducting state will behave like a conventional ceramic material.

Therefore, during the transition of the superconducting article 100 between states, the strength of the magnetic field at a given location will change. It is possible by coupling with the changing magnetic field to extract usable energy. In all embodiments of the invention, the transition is caused by cooling or heating the superconducting article 100 through $T_c$.

A first embodiment of the invention generates mechanical energy. An engine 110, shown schematically in FIGS. 2(a), 2(b), and 2(c), includes a movable mechanical member such as a beam 114 supported by a fulcrum 112. The superconducting article 100 is attached to one end of the beam 114 and a counterweight 116 is attached to the opposite end.

Figure 2C:
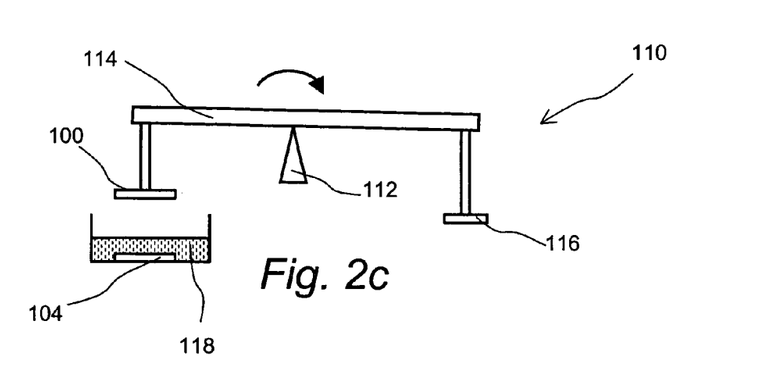

The article 100 is suspended directly above the magnet 104 contained in a liquid-nitrogen cooling bath 118, the magnet 104 being oriented vertically, that is, with its poles aligned up and down. The beam 114 is free to swing about the fulcrum 112 between first and second positions. In the first position, the article 100 is spaced well apart from the magnet 104 and also well clear of the cooling bath 118. In the second position, the article 100 is in close proximity with the magnet 104 and is placed in the cooling bath 118, or close enough to be cooled thereby.

Figure 3:
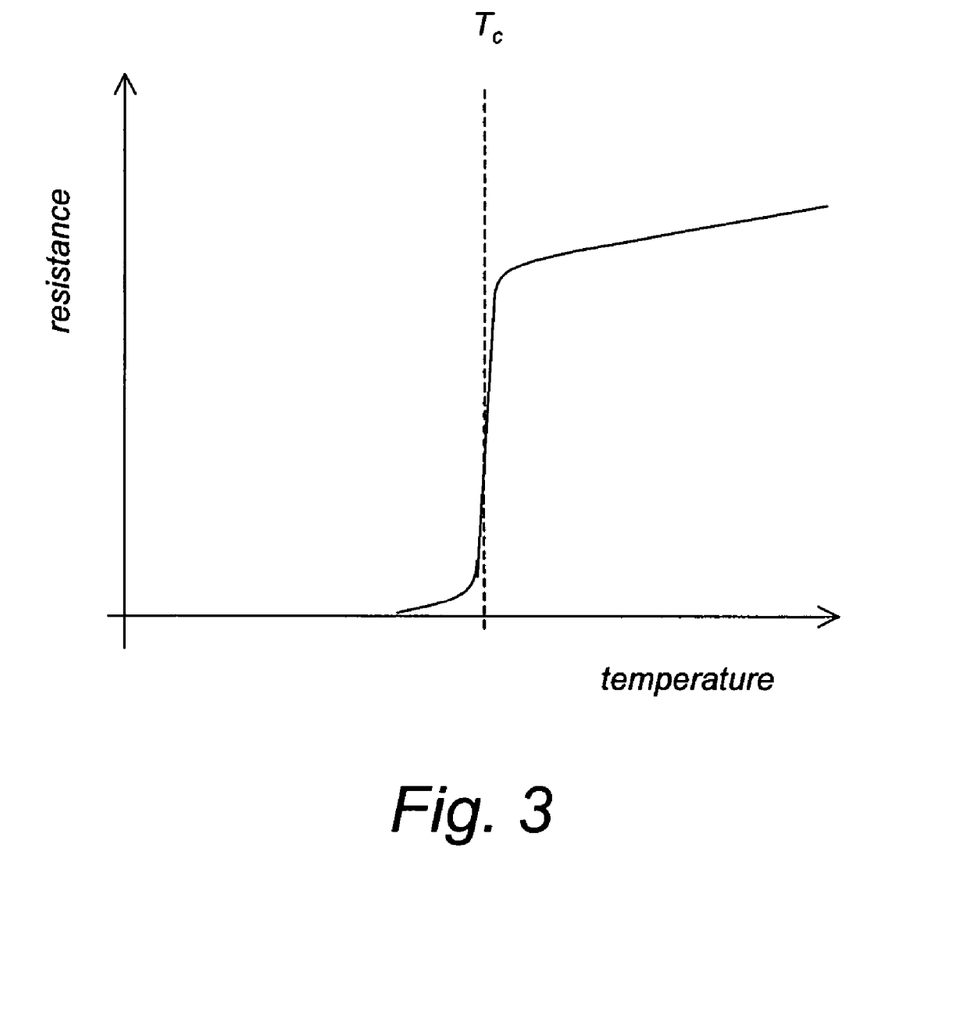
FIG. 3 is a resistivity-temperature curve showing a transition of a superconductor through a transition temperature.

The superconducting article 100 is selected to have a $T_c$ higher than the temperature of the cooling bath, which in the present case is defined by the boiling point of liquid nitrogen, 77° K. In other words, the bath 118 can cool the article to below $T_c$. In the engine 110, the material selected for the superconducting article is $YBa_2Cu_3O_7$ (YBCO), which has a $T_c$ of 93° K., although it could be any superconducting material with a sufficiently high $T_c$. Other possibilities include $YBa_4Cu_7O_{15}$ ($T_c$=93° K.), $Bi_2Sr_2CaCu_7O_9$ ($T_c$=110° K.) and $HgBa_2Ca_2Cu_3O_8$ ($T_c$=123–124° K.). The resistivity-temperature curve for YBCO is shown in FIG. 3. The YBCO composition is typical of ceramic superconductors in that it is an insulator above $T_c$. Whatever cooling means is used, it must correspond with a superconducting material having an appropriate $T_c$. At present, the upper temperature limit of potential coolants must be below 138° K., the highest $T_c$ currently known (for $Hg_{0.8}Tl_{0.2}Ba_2Ca_2Cu_3O_{8.33}$).

The engine 110 works as follows. With the superconducting article 100 above its transition temperature, the beam 114 is balanced so that gravity is just sufficient to bring the article 100 into the cooling bath 118 and into close proximity with the magnet 104. Once the article 100 has cooled below the transition temperature, it reflects the magnetic field of the magnet 104 as a mirror image. This produces a repulsive force so that the superconducting article 100 moves away from the magnet 104 and out of the cooling bath 118. The ambient temperature being higher than the transition temperature, the article 100 warms up sufficiently to lose its superconductivity. It no longer reflects the magnetic field of the magnet 104, and the repulsive force decays. Gravity brings the article 100 back into the cooling bath 118 and into close proximity with the magnet 104, for the cycle to be repeated. The beam 114 can continue to oscillate indefinitely as long as the cooling bath is maintained below $T_c$. In effect, energy originally consumed in liquefying the nitrogen is released as mechanical energy.

Figure 4:
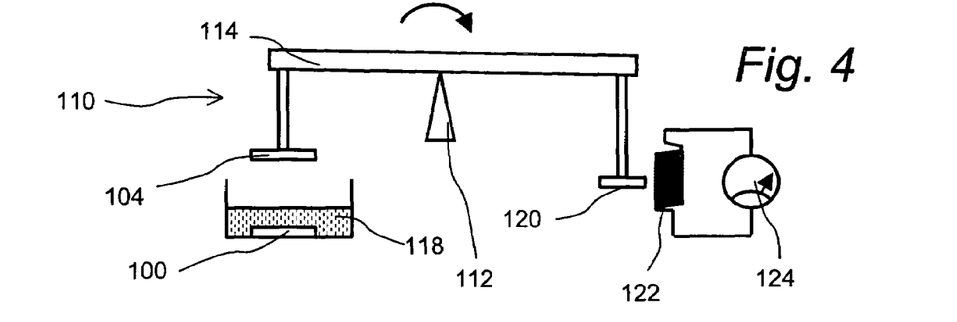
FIG. 4 is a diagram of the engine of FIGS. 2(a), 2(b), and 2(c) in accordance with a second embodiment of the invention, the engine configured also to generate electrical energy.

In a second embodiment shown in FIG. 4, the counterweight 116 is a second magnet 120 next to which is disposed an electrically conductive wire 122, which could be a coil. With oscillation of the beam 114, the second magnet 120 moves relative to the wire 122, and a resulting variation in magnetic flux 121 at the wire 122 induces an alternating electrical current therein detectable with a meter 124.

Figure 5A:
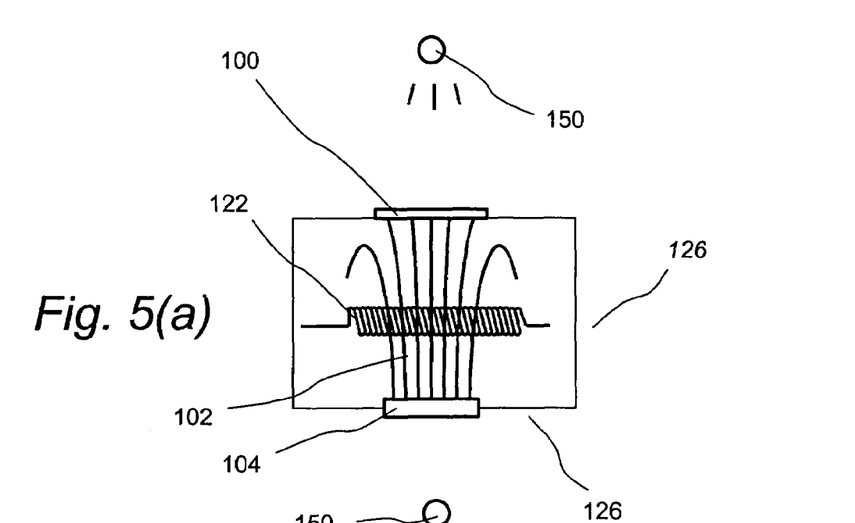
FIGS. 5(a) and 5(b) are diagrams of an engine in accordance with a third embodiment in which the electrical energy is generated by alternately exposing the superconducting article to and shielding it from thermal radiation.
Figure 5B:
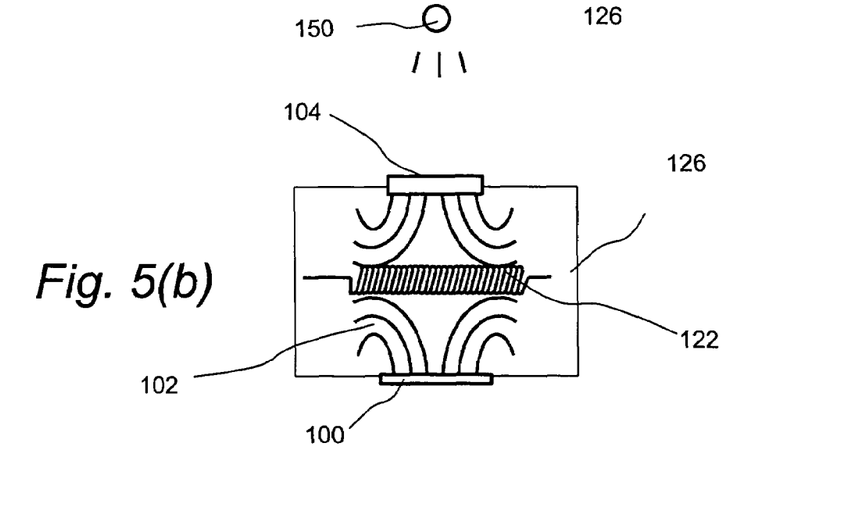

In a third embodiment, an assembly 126 is constructed wherein the superconducting article 100 and a magnet 104 are fixedly spaced by a distance within which the undeviated magnetic field of the magnet 104 extends to the superconducting article 100. The conductive wire or coil 122 is disposed in the undeviated magnetic field, as illustrated in FIG. 5(a). When the article 100 is cooled to below $T_c$, it becomes superconducting and reflects the magnetic field of the magnet 104, thus setting up a mutual repulsion. The resultant deviated magnetic field between the article 100 and the magnet 104 is illustrated in FIG. 5(b).

Thus, an alternating current is induced in the wire 122 as it is exposed to a varying magnetic field when the article 100 goes through the transition between states.

This effect could be executed by intermittent thermal irradiation of the article 100, such that it would be above $T_c$ when irradiated and below $T_c$ when not irradiated. This would be particularly achievable in a space environment, as illustrated in FIGS. 5(a) and 5(b). The assembly 126 would be allowed to spin so that the superconducting article 100 alternately faced towards and away from the sun 150.

Figure 6:
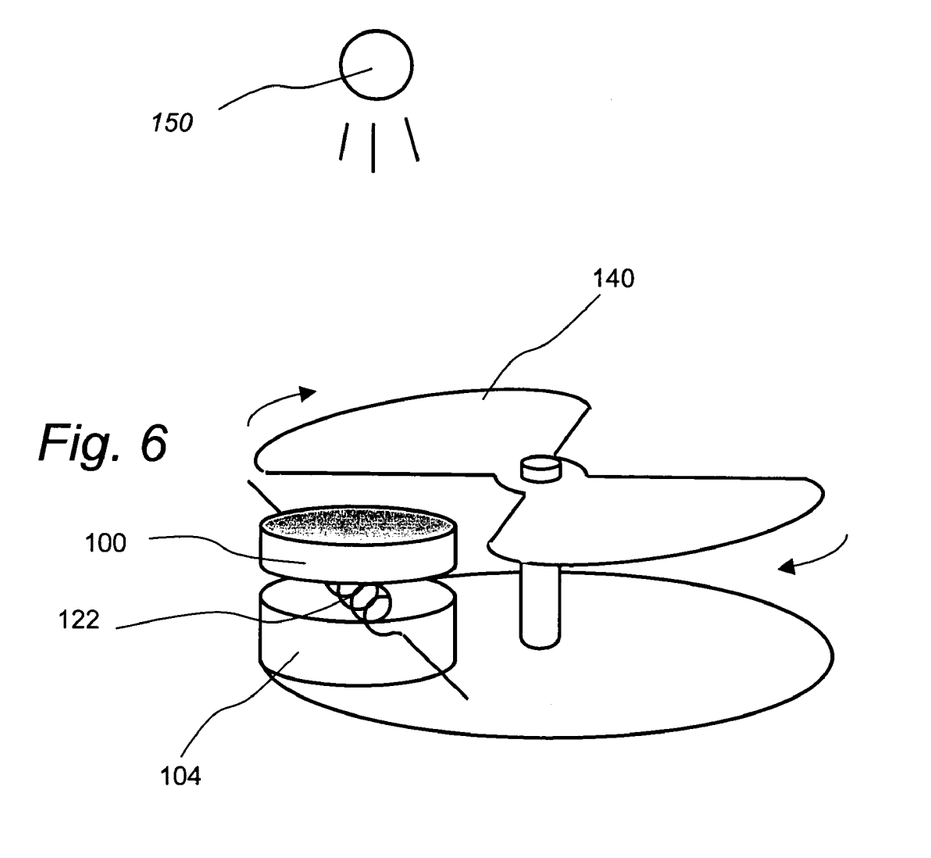
FIG. 6 shows the engine of FIGS. 5(a) and 5(b) with a mask intended to alternately expose the superconducting article to and shield it from radiation.
Figure 7:
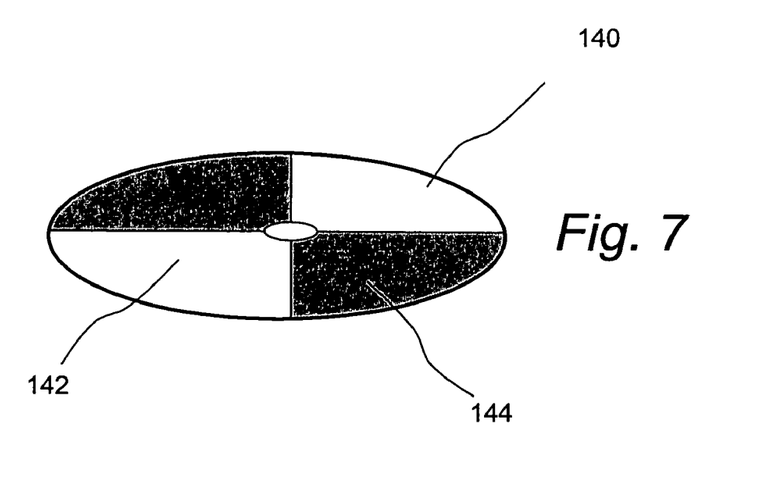
FIG. 7 shows the mask of FIG. 6 configured to have alternate heat absorbing and heat reflecting segments.

The third embodiment could be modified to provide for the superconducting article 100 to face the sun at all times, being alternately exposed to solar radiation and shielded by a movable mask 140. This could, for example, be a disc rotating about an axis perpendicular to the exposed face of the article, the disc having alternate open and solid segments as in FIG. 6, or it could be a slat (not illustrated) rotating about an axis generally parallel to the exposed face of the article. The rotating disc might also be entirely solid with alternating heat reflective segments 142 and heat absorbing segments 144, as in FIG. 7. This could provide an advantage compared with an array of conventional solar cells, for example, since the solid disc would provide protection from damage by foreign particles of space debris.

Figure 8A:
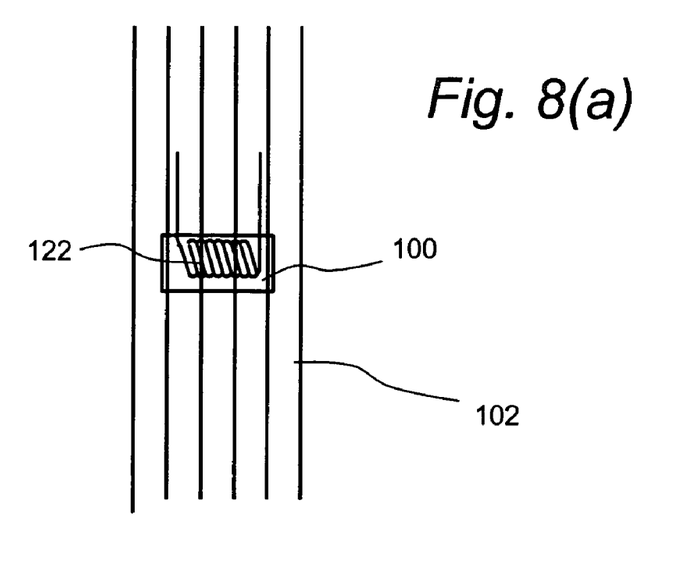
FIGS. 8(a) and 8(b) are diagrams of a portion of the engine of FIGS. 5(a) and 5(b) showing an electrically conductive coil embedded in the superconducting article in the non-superconductive state and the superconductive state respectively.
Figure 8B:
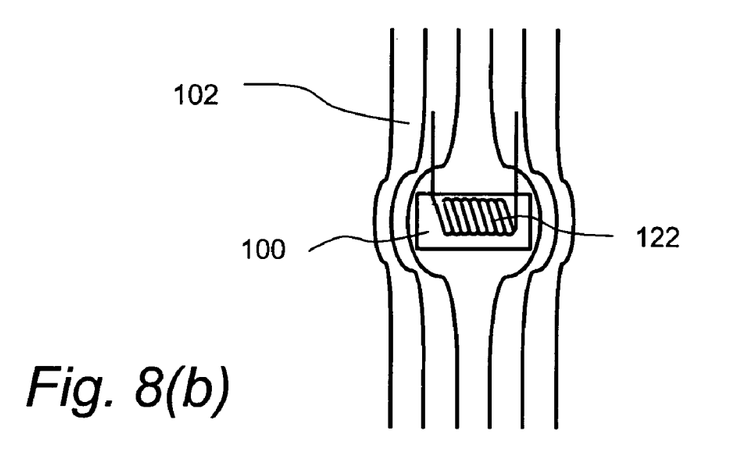
Figure 9:
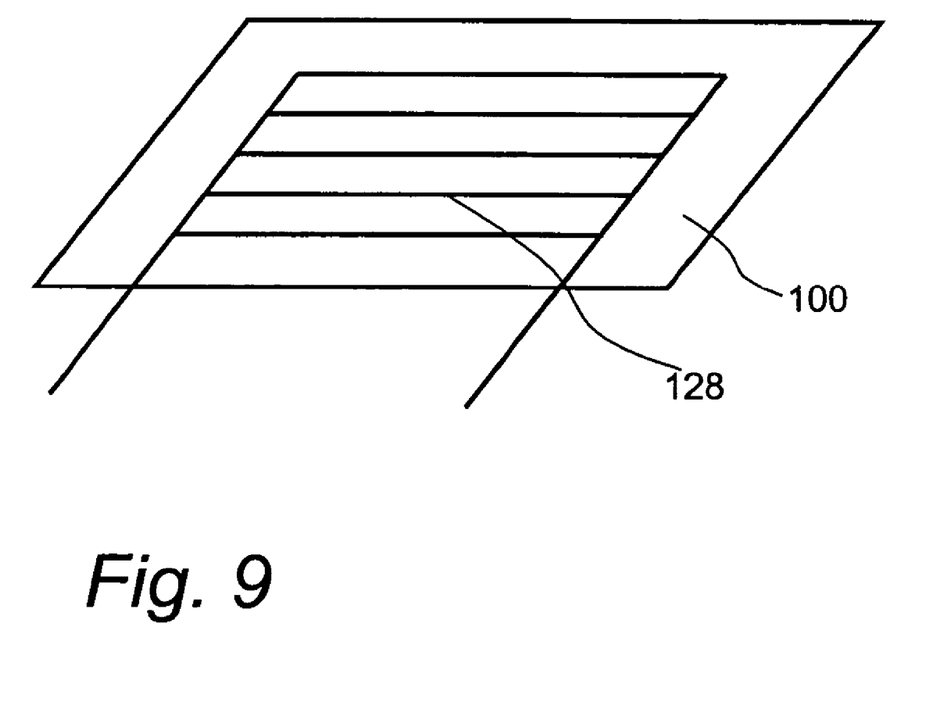
FIG. 9 is a diagram of a portion of the engine of FIGS. 5(a) and 5(b) wherein a grid of conductive wires is disposed into a surface of the superconductive article.

A modified structure of the third embodiment is illustrated in FIGS. 8(a) and 8(b). Here, the wire or coil 122 is embedded inside the article 100, as can be done in the case of a ceramic superconductor by conventional ceramic forming techniques. In FIG. 8(a), the article is in the non-superconducting state, with the magnetic field 102 passing through the article undeviated. In FIG. 8(b), the article is in the superconducting state and the magnetic field 102 is deviated around the article. In another modification shown in FIG. 9, a series of fine conductive wires in the form of a grid 128 could be pressed into the surface of the superconducting article 100 which could be in the form of a thin layer.

The generation of alternating electrical current in the coil 122 by cycling the article 100 between the superconducting and non-superconducting states is analogous to what occurs in a conventional electric generator, whereby a current is generated in electrically conductive windings that move relative to a magnetic field. A given portion of the windings "sees" a varying magnetic field strength as the windings move.

Figure 10A:
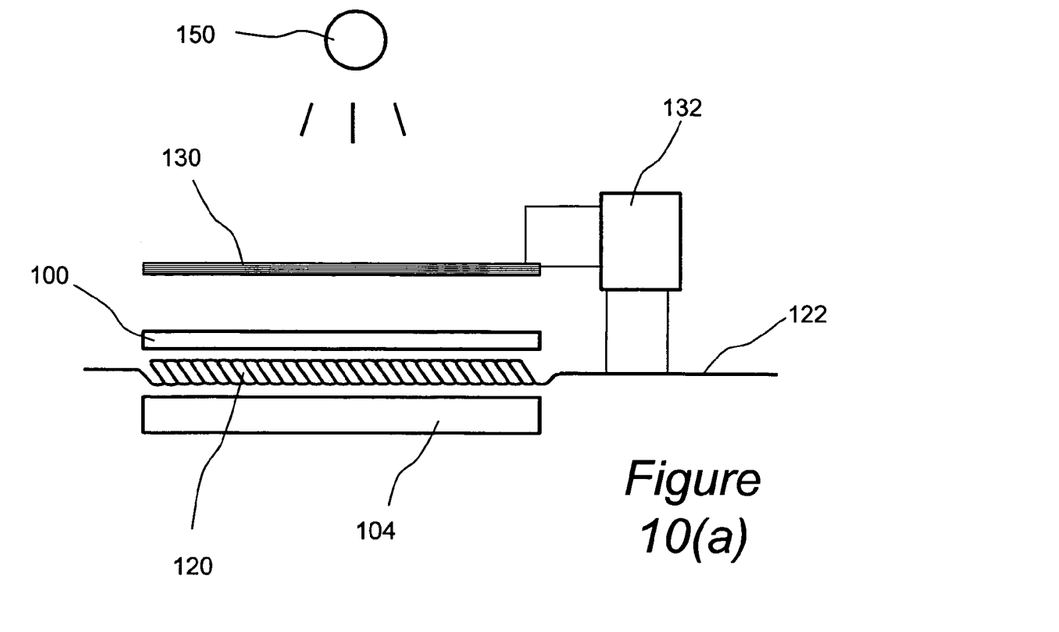
FIGS. 10(a) and 10(b) are diagrams of an engine in accordance with a fourth embodiment having a liquid crystal shutter controlled by feedback from the released electrical energy, the shutter alternately intercepting and passing radiation.
Figure 10B:
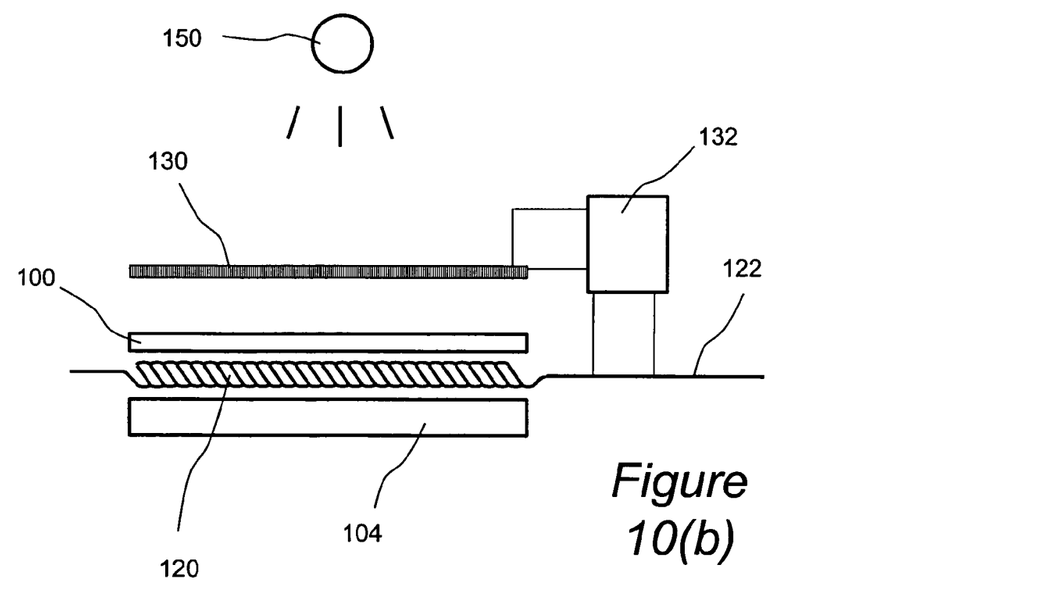

In a fourth embodiment, illustrated in FIGS. 10(a) and 10(b), part of the current generated in the wire or coil 122 could be used in a feedback mode to actuate a liquid crystal shutter 130 which alternately intercepts and passes solar radiation directed towards the superconducting article. The shutter 130 could be controlled by a conventional rectifying circuit 132 that would deliver a unidirectional current varying between zero and some upper limit. With the current at the upper limit, as in FIG. 10(a), the shutter 130 would be dark, therefore intercepting radiation and allowing the article to cool below $T_c$. With the current at zero, as in FIG. 10(b), the shutter 130 would be clear, thus passing radiation to the article so that it would heat to above $T_c$.

Figure 11:
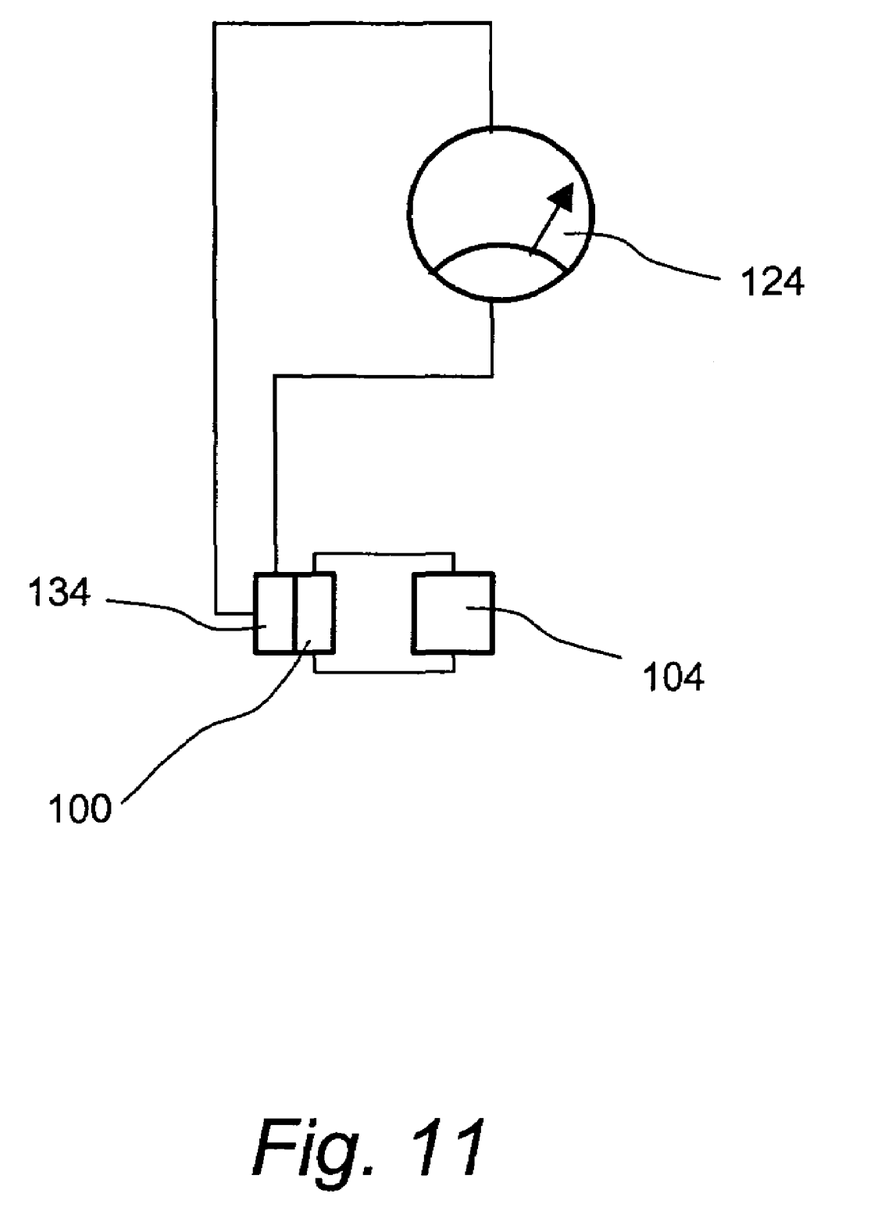
FIG. 11 is a diagram of an engine in accordance with a fifth embodiment having a piezoelectric element for releasing the electrical energy.

In a fifth embodiment shown in FIG. 11, electrical power is generated by a piezoelectric body 134. The superconducting article 100 and the magnet 104 are spaced within interactive range of each other, and either of them is connected to the piezoelectric body so that it can exert a varying pressure thereon in response to article 100 going in and out of the superconducting state. The wire 122 is connected to the piezoelectric body 134, and the electrical current generated therein can be registered on the meter 124.

The various embodiments and modifications described above are not intended to be exhaustive. For example, any embodiment could be used in combination with any appropriate masking or shuttering device. While the invention has been shown and described with particularity, it will be appreciated that various changes and modifications may suggest themselves to one having ordinary skill in the art upon being apprised of the present invention. The invention is intended to encompass all such changes and modifications as fall within the scope and spirit of the appended claims.

The invention claimed is:

1. An engine comprising:
    (a) a superconducting article having a transition temperature $T_c$;
    (b) a magnet which can interact with the superconducting article so that the magnet has an undistorted magnetic field when the superconducting article is above $T_c$, and a distorted magnetic field when the superconducting article is below $T_c$;
    (c) a means of changing the temperature of the superconducting article between temperatures above and below $T_c$; and
    (d) an electrical conductor that produces an electrical current in response to the change of the magnetic field between the distorted and non-distorted conditions.

2. The engine of claim 1, wherein the electrical conductor is directly exposed to the magnetic field.

3. The engine of claim 1, including also a piezoelectric body responsive to a change in pressure exerted by one of the magnet and the article, the electrical conductor being connected to the piezoelectric body.

4. The engine of claim 1, wherein the means of changing the article between temperatures above and below $T_c$ is a movable mask.

5. The engine of claim 4, wherein the movable mask has open and closed segments.

6. The engine of claim 4, wherein the movable mask has heat absorbing and heat reflecting segments.

7. The engine of claim 1, wherein the means of changing the temperature of the superconducting article between temperatures above and below $T_c$ is a capability of the superconducting article to revolve between positions wherein it faces towards and away from the sun.

8. The engine of claim 1, wherein the means of changing the temperature of the superconducting article between temperatures above and below $T_c$ is a liquid crystal shutter capable of responding to feedback from the electrical current.

9. The engine of claim 2, wherein the electrical conductor is a coil.

10. The engine of claim 2, wherein the electrical conductor is embedded in the superconducting article.

11. The engine of claim 2, wherein the electrical conductor is a wire grid attached to a surface of the article.

* * * * *